(12) United States Patent
Dwars

(10) Patent No.: US 8,725,075 B2
(45) Date of Patent: May 13, 2014

(54) METHOD FOR COMMUNICATING AN ELECTRICAL SIGNAL

(75) Inventor: Sicco Dwars, Rijswijk (NL)

(73) Assignee: Shell Oil Company, Houston, TX (US)

( * ) Notice: Subject to any disclaimer, the term of this patent is extended or adjusted under 35 U.S.C. 154(b) by 384 days.

(21) Appl. No.: 13/256,647

(22) PCT Filed: Mar. 15, 2010

(86) PCT No.: PCT/EP2010/053243
§ 371 (c)(1),
(2), (4) Date: Sep. 15, 2011

(87) PCT Pub. No.: WO2010/105997
PCT Pub. Date: Sep. 23, 2010

(65) Prior Publication Data
US 2012/0009879 A1    Jan. 12, 2012

(30) Foreign Application Priority Data

Mar. 17, 2009   (EP) ..................................... 09155375

(51) Int. Cl.
*H04B 7/00*   (2006.01)
*H04B 13/02*   (2006.01)
*H04B 5/00*   (2006.01)

(52) U.S. Cl.
USPC ........................... 455/41.2; 455/40; 455/41.1

(58) Field of Classification Search
USPC ................................................. 455/40, 41.1
See application file for complete search history.

(56) References Cited

U.S. PATENT DOCUMENTS

| 6,515,592 | B1 * | 2/2003 | Babour et al. | 340/854.4 |
| 8,289,173 | B2 * | 10/2012 | Ben-Mansour et al. | 340/605 |
| 2005/0024231 | A1 * | 2/2005 | Fincher et al. | 340/854.4 |
| 2010/0286791 | A1 * | 11/2010 | Goldsmith | 623/23.7 |
| 2011/0227721 | A1 * | 9/2011 | Mezghani et al. | 340/539.1 |

FOREIGN PATENT DOCUMENTS

| EP | 1662673 | 5/2006 | H04B 5/00 |
| WO | WO9424777 | 10/1994 | H04B 5/00 |
| WO | WO2009003123 | 12/2008 | A61N 1/32 |

* cited by examiner

*Primary Examiner* — Andrew Wendell
*Assistant Examiner* — Maryam Soltanzadeh

(57) ABSTRACT

A system and method for communicating an electrical signal from a first region to a second region via an electrically conductive wall between the first and second regions. The method comprises using a transmitter to generate the signal in the first region, using the wall or a segment of the wall as part of a transmission path for the signal between the first region and the second region, wherein the transmitter comprises an output impedance and means for matching the output impedance and an impedance of the wall determined by an electrical property of the wall. The system comprises a first region separated from a second region by means of an electrically conductive wall, wherein the first region comprises a transmitter for generating an electronic signal in the first region, which transmitter has an output impedance that matches an impedance of the wall.

15 Claims, 4 Drawing Sheets

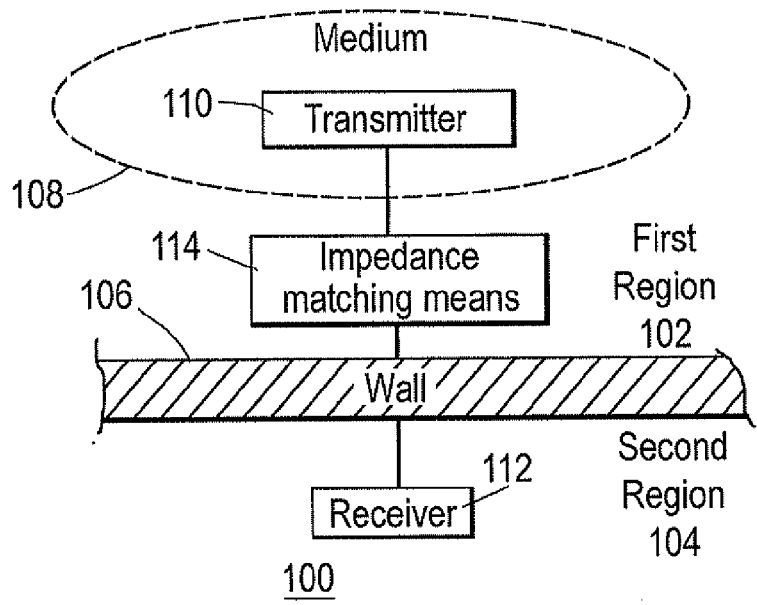
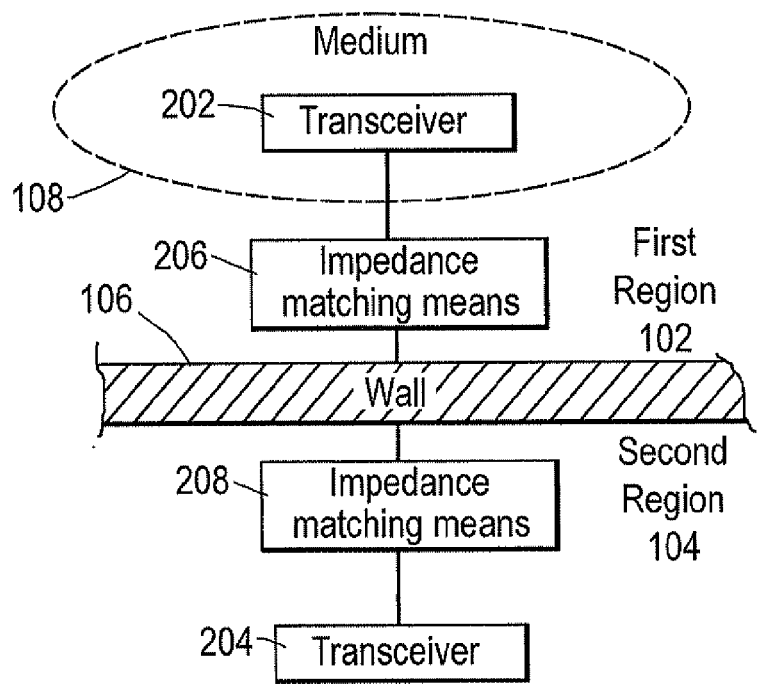

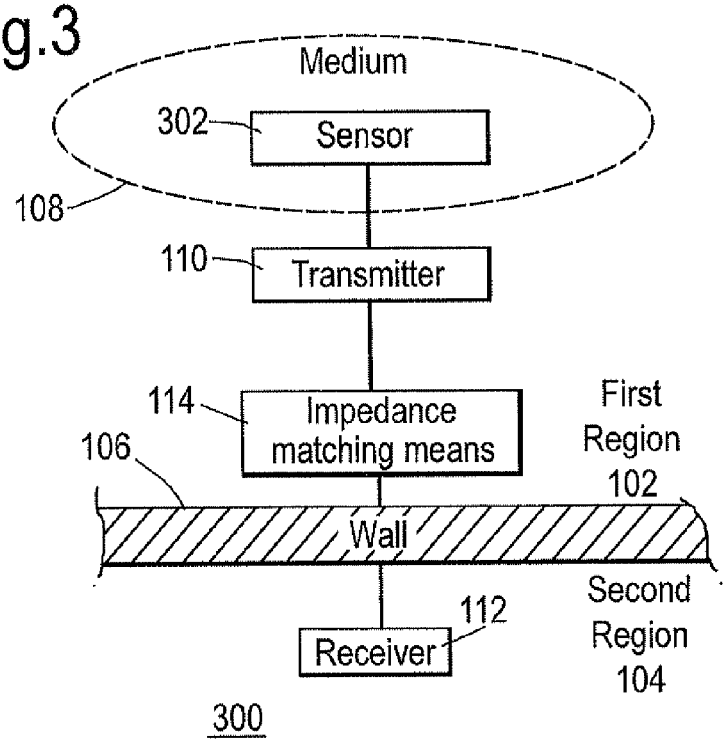
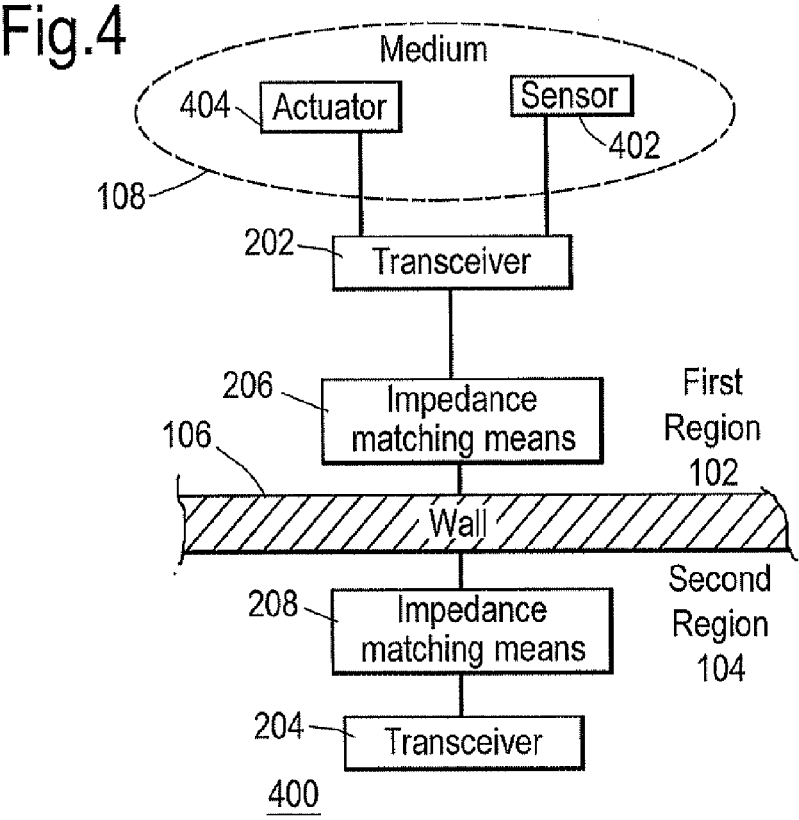

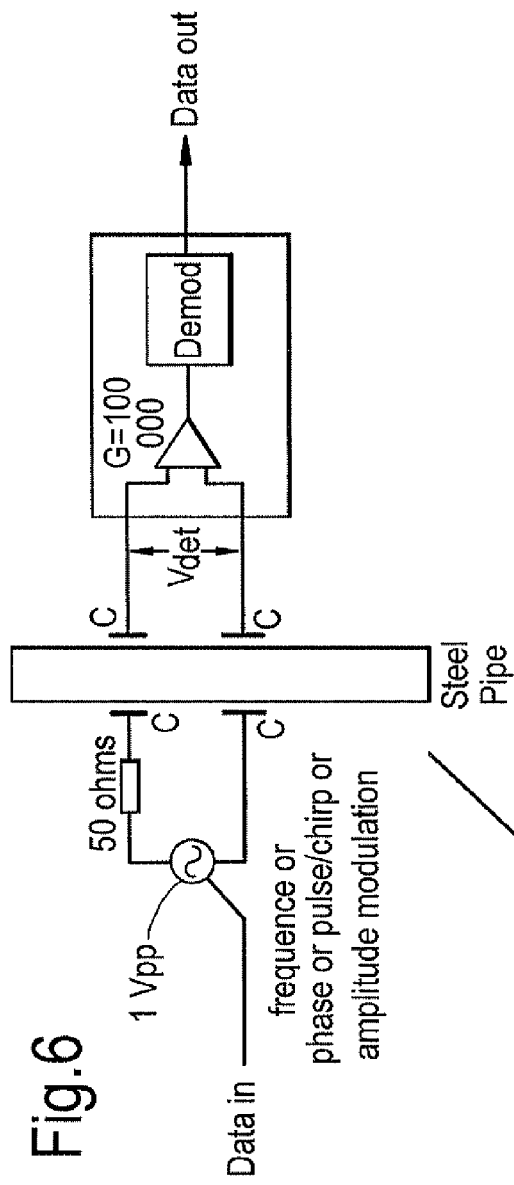

METHOD FOR COMMUNICATING AN ELECTRICAL SIGNAL

CROSS REFERENCE TO EARLIER APPLICATIONS

The present application is a national stage entry of and claims priority to PCT Application EP2010/053243, filed 15 Mar. 2010, which claims priority to European Patent Application No. EP09155375.0, filed 17 Mar. 2009, which are incorporated herein by reference.

FIELD OF THE INVENTION

Background of the Invention

The present invention relates to a method for communicating an electrical signal via a wall from a first region to a second region which signal provides information about a medium which is present in the first region. The invention further relates to a combination of a segment and a transmitter, wherein the segment is configured for use as part of a wall between a first region and a second region. The invention further relates to a transmitter as well as to a system for use in the present method.

Instruments that are conventionally used in oil and gas facilities to measure the pressure and temperature of a fluid which flows through a pipeline require process tappings. The use of process tappings is, however, highly undesirable because they require additional maintenance and they pose a risk of leakage, loss of containment, and therefore to safety. Such risks inhibit, for example, the design of economic and safe facilities for hydrogen sulphide contaminated toxic natural gas fields.

It is known to measure the flow of a fluid inside a pipeline by using ultrasonic clamp-on or coriolis meters. The use of such meters to measure fluid characteristics such as flow, density, chemical composition, pressure and temperature is, however, difficult. The same applies to gamma-ray instruments.

It is also commonly known that ultrasonic techniques can be used to communicate signals through metal walls of pipes or vessels. Downside of that communication method is that data rates are relatively low while energy consumption is relatively high, which inhibits long lasting battery or energy scavenging powered wireless devices. The same downside applies to a purely magnetic communication link (e.g. coil on one side and another coil or Hall element at the other side) though obstacles such as stainless steel metal walls. For example, in EP 1,662,673 the passing of magnetic signals through metal barriers is described, whereby the metal is first magnetically saturated, by DC or by very strong permanent magnets. This facilitates passing of the alternating magnetic signal through the metal barrier. However, this requires additional measures and equipment, and increased maintenance.

An object of the present invention is to provide an improved enabling method for measuring a variety of characteristics of a fluid inside a system such as an oil and/or gas pipeline, which method reduces significantly the risk of leakages, and/or the amount of maintenance required.

SUMMARY OF THE INVENTION

Surprisingly, it has now been found that this can be realized when the measurement is based on an electrical signal which is generated by means of a transmitter inside the pipeline, whereby a section of the wall of the pipeline is used as part of the transmission path of the signal, and the transmitter comprises an output impedance and means for matching the output impedance and an impedance of the wall, the latter being determined by an electrical property of the wall.

BRIEF DESCRIPTION OF THE DRAWINGS

The invention will be further illustrated by means of the Figures, wherein:

FIG. 1 is a block diagram illustrating a first configuration of a system constructed in accordance with an embodiment of the invention;

FIG. 2 is a block diagram illustrating a second configuration of a system constructed in accordance with an embodiment of the invention;

FIG. 3 is a block diagram illustrating a third configuration of a system constructed in accordance with an embodiment of the invention;

FIG. 4 is a block diagram illustrating a fourth configuration of a system constructed in accordance with an embodiment of the invention;

FIGS. 6, 6a, and 6b illustrate a second application of the invention.

DETAILED DESCRIPTION OF THE PREFERRED EMBODIMENTS

Figure 5:
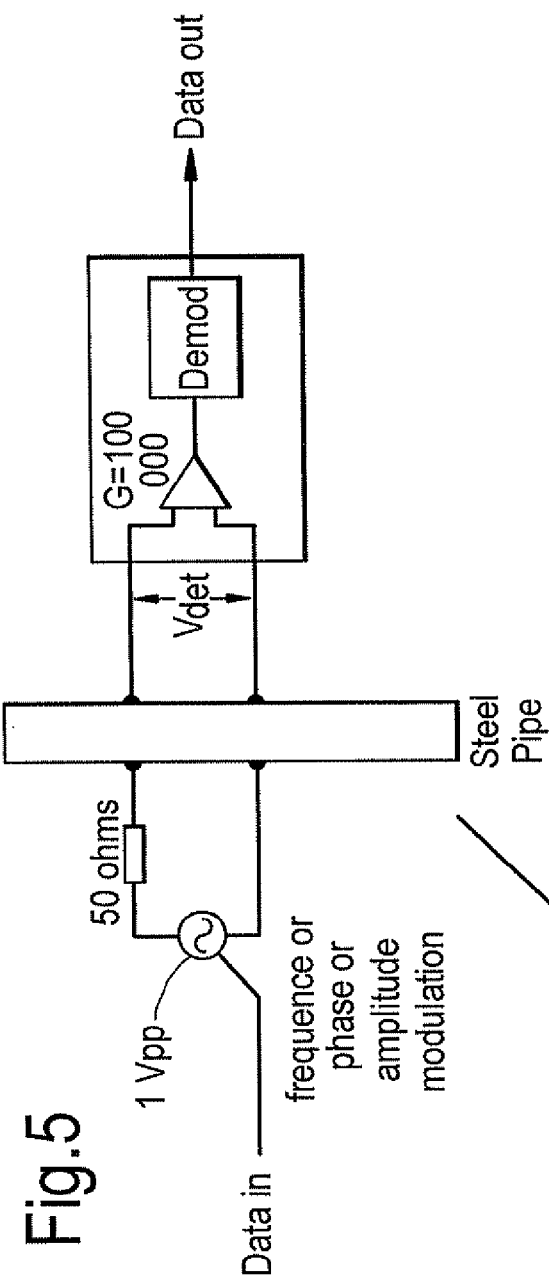
FIGS. 5, 5a, and 5b illustrate a first application of the invention.

Accordingly, the present invention relates to a method for communicating an electrical signal from a first region to a second region via an electrically conductive wall between the first region and the second region, the method comprising using a transmitter for generating the signal in the first region, using the wall as part of a transmission path for the signal between the first region and the second region, wherein the transmitter comprises an output impedance and means for matching the output impedance and an impedance of the wall determined by an electrical property of the wall.

The present invention does not use magnetic or electromagnetic signals. No magnetic saturation is needed upfront.

The electrical signal to be used in accordance with the present invention is, for instance, a bit stream representing successive samples of a fluid pressure. The carrier frequency of the frequency, amplitude, phase or pulse modulated electrical signal is, for instance, anywhere from 10 kHz to 10 GHz.

Suitable transmitters to be used in accordance with the present invention include 50 ohms output impedance radio transmitters as commonly used for wireless radio links.

In a suitable embodiment of the present the signal is representative of a characteristic of a medium which is present in the first region.

Suitably, such a medium comprises a fluid which comprises at least one of: a hydrocarbon and a toxic component such as hydrogen sulphide.

Suitable examples of such fluids include oil, water and gas streams produced from subsurface reservoirs such as natural gas, associated gas and coal bed gas methane, or products from (partial) oxidation processes.

In other embodiments, the signal is representative of a characteristic of apparatus located in the first region, for example a submerged pump whose vibration level is to be measured.

The characteristics of the medium which can be measured in accordance with the present invention include fluid characteristics such as level of the free surface of a liquid medium, foam layer thickness, emulsion layer thickness, oil/water interface level, flow, density, chemical and/or physical composition, particle sizes, tracer or marker concentration, sand concentration, pressure and temperature. In above embodiment, the transmitter itself is sensitive to characteristics of the medium, in the sense that a change in magnitude of the characteristic causes a change in the bit stream behavior of the transmitter. In a purely analog embodiment, for example, a change in the temperature or pressure of the medium causes a change in the amplitude, duty-cycle, frequency or phase of the transmitter's signal.

Alternatively, use is made of a dedicated sensor which is connected to the transmitter. The sensor is operative to supply a sensor signal to the transmitter, which sensor signal is representative of a characteristic of the medium which is present in the first region. The transmitter transmits a signal representative of the sensor signal received.

Suitable sensors to be used for this purpose include thermocouples, positive temperature co-efficient resistors (PTC's, PT100 elements), magneto resistive sensors, strain gauges, piezo elements, semiconductor (Si, GaAs, Ge) sensors, optical sensors, photo diode array's, CCD cameras, etc. In the second region a receiver is preferably used for receiving the signal via the wall.

Suitable receivers to be used in accordance with the present invention include those used in wireless radio links.

The sensitivity of the receiver is suitably in the range of from −10 to −150 dB, preferably in the range of from −10 to −100 dB.

The transmitter can suitably be galvanically coupled to the wall.

In another suitable embodiment of the present invention, the transmitter is capacitively coupled to the wall.

In yet another suitable embodiment of the present invention, the coupling on one side of the wall is capacitive, whereas the coupling on the other side is galvanic, for example, spot-welded.

The transmitter to be used in accordance with the present invention is suitably powered via at least one of: a battery accommodated in the first region or a device accommodated in the first region for scavenging ambient energy such as vibration or heat or light or an alternating magnetic field flux that may have been generated in the second region, but which penetrates into the first region.

Suitable examples of devices for scavenging ambient energy include micro-machined thermopiles, piezo generators, magnetic coupled mass-spring system, solar cells, and electrochemical cells.

The output impedance of the transmitter can suitably be in the range of from 0.01-100 Ohms, preferably in the range of from 40-60 Ohms.

The transmitter comprises a means for matching the output impedance and an impedance of the wall, the latter being determined by an electrical property of the wall. Such an electrical property of the wall is for instance 0.01 Ohms.

Matching the impedances of the transmitter, the transmission path, and the receiver is good practice when aiming to achieve maximum reach at minimum energy for conventional radio links. The objective of this invention is to pass signals through metal walls, walls normally regarded as elements of 'Faraday cages' that inhibit radio signals to pass. Matching impedances is less relevant for systems that exploit the concepts disclosed in this invention.

The thickness of the electrically conductive wall can suitably be in the range of from 0.1 mm-10 cm. Preferably, the thickness of the wall is in the range of from 1-10 mm In a particular attractive embodiment of the present invention use is made of a further receiver in the first region for receiving the tiny remainder of the transmitter's signal via the wall from the second region, which signal enables or disables the transmitter, powers the transmitter, configures an operational mode of the transmitter, configures a sensor which is connected to the transmitter in the first region, which sensor is operative to supply a sensor signal to the transmitter which sensor signal is representative of a characteristic of a medium present in the first region, or, when reversing signal direction by swapping transmitter and receiver locations, controls an actuator accommodated in the first region, or plays any suitable combination of the above roles.

In a preferred embodiment of the present invention the sensor that is connected to the transmitter is in direct contact with the medium.

Suitably, the wall between the first and second region is a wall of a room, a vessel, a container or a pipe, and the first region is an inner region of the room, the vessel, the container or the pipe.

Alternatively, the wall between first and second region is a metal wall of a building or room that only has metal walls, and therefore is an area where wireless networks typically do not have adequate coverage. Examples of these are analyzer houses, or control rooms on offshore platforms, or below deck rooms on marine vessels.

Preferably, the method according to the present invention is used to measure characteristics of a fluid that flows through an oil or gas pipeline.

The wall to be used in accordance with the present invention is an electrically conductive wall, which is preferably made of a material selected from the group consisting of metals and metal alloys.

Suitable examples of metals include iron, copper, nickel, stainless steel, corrosion resistant alloys, titanium, aluminum, and carbon steel.

Preferably, the metal is carbon steel, stainless steel, titanium, or corrosion resistant alloy (CRA). More preferably, the metal is CRA.

Suitably, the signal can be sent and received in either direction through the wall, either in half or full duplex mode.

The present invention also relates to a combination of a segment and a transmitter for use in the method according to the present invention, the segment being configured for use as a part of the wall between the first and second regions.

In addition, the present invention provides a system comprising a first region which is separated from a second region by means of an electrically conductive wall, wherein the first region comprises a transmitter for generating an electronic signal in the first region, which transmitter comprises an output impedance and means for matching the output impedance and an impedance of the wall, the latter being determined by an electrical property of the wall.

The present system preferably further comprises a sensor which is connected to the transmitter, which sensor is operative to supply a sensor signal to the transmitter, which sensor signal is representative of a characteristic of the medium which is present in the first region.

Preferably, the present system further comprises in the second region a receiver for receiving the signal via the wall.

Suitably, the wall is a wall of a room, a vessel, a container or a pipe, and the first region is an inner region of the room, the vessel, the container or the pipe.

Preferably, the wall is made of a material selected from the group consisting of metals and metal alloys. Suitable and preferred metal and metal alloys to be used have been described hereinabove.

The present invention will now be described by way of FIGS. 1-6b.

FIG. 1 is a block diagram illustrating a first configuration of a system 100 of the invention. System 100 comprises a first region 102 separated from a second region 104 by an electrically conductive wall 106. First region 102 comprises a medium 108, e.g., a gas or a liquid. A transmitter 110 is accommodated in first region in physical contact with medium 108. Transmitter 110 is configured in such a manner, that a change in a physical or chemical property of medium 108 affects the electrical behavior of transmitter 110. For example, the property of medium 108 relates to, e.g., temperature, pressure, chemical composition, speed of flow, or another characteristic. A change in the property causes a change in the electrical behavior of transmitter 110, e.g., a change in the frequency, amplitude, duty-cycle, phase, etc., of the signal generated by transmitter. Accordingly, the signal generated by transmitter 104 is representative of the change in the property of medium 108.

Wall 106 is electrically conductive. Transmitter 110 generates an electrical signal. The signal is galvanically coupled wall 106. In order to have the signal propagate through wall 106 and in order for the signal to have some energy left that is adequate enough for its being detected by a receiver 112, the output impedance of transmitter 110 should be matched to the electric impedance of wall 106. Depending on an electric property of wall 106, determined by, e.g., its electrical conductivity and its thickness, impedance matching means 114 is provided between transmitter 110 and wall 106 so as to efficiently use whatever energy is available to transmitter 110. Examples of such transmitter 110 and impedance matching means 114 are given in other diagrams discussed in detail below. Accordingly, information about medium 108 is electrically transmitted via wall 106, without the need for openings in wall 106 to accommodate wires that conduct the signal from transmitter 110. Furthermore, even though wall 106 would normally be regarded part of a Faraday cage, hence normally regarded as making communication impossible between the two regions segregated by this wall, the method disclosed in this invention makes such communications possible.

FIG. 2 is a block diagram illustrating a second configuration of a system 200 of the invention. Transmitter 110 of system 100 has now been replaced by a transceiver 202, and receiver 112 of system 100 has been replaced by a transceiver 204. In this configuration, uni-directional signal propagation is possible between regions 102 and 104 via electrically conductive wall 106. For those well aware of the state of the art for bi-directional radio links, it is obvious that bi-directional links through the metal walls, as disclosed in this invention, can be realized equally well.

The examples discussed above focused on single sensor or single actuator systems present in a first region perimeterised by the metal wall whose prime use is containment of high pressure and/or toxic fluids processed in of transported by vessels or pipelines. For those well acquainted with state of the art for wireless mesh networking, as disclosed for example by the Wireless HART® (HART 7.0, or IEC 62591) specification, it is obvious that the method disclosed here can link multiple sensors or multiple actuator systems equally well by extending the range of wireless sensor networks from a region one outside a pipe or vessel to region two within such pipes or vessels or compartments or rooms with metal walls.

Now, transceiver 202 in first region 102 has been provided with impedance matching means 206 to efficiently couple the transmitter part of transceiver 202 to wall 106, and transceiver 204 in second region 104 has been provided with impedance matching means 208 to efficiently couple the transmitter part of transceiver 204 to wall 106. The bi-directional signal path can be used to send information about medium 108 to second region 104, and also to send a signal to transceiver 202 for reconfiguring transceiver 202, or to have transceiver 202 control an actuator (not shown).

FIG. 3 is a block diagram illustrating a third configuration of a system 300 of the invention. In system 300, transmitter 110 is connected to a dedicated sensor 302 positioned in contact with medium 302. Now, the information about medium 108 is represented by the signal generated by sensor 302 and supplied to transmitter 110. Transmitter 110 can now be of any suitable design and need not be configured to have a behavior reflecting a characteristic of medium 108 as in system 100.

FIG. 4 is a block diagram illustrating a fourth configuration of a system 400 of the invention. Transceiver 202 is coupled to a sensor 402 accommodated in medium 108. Sensor 402 is operative to supply a sensor signal to transceiver 202, automatically or upon being enabled by transceiver 202. The sensor signal is representative of a characteristic of medium 108. Transceiver 202 can receive control signals from transceiver 204 via wall 106. The control signal can be used to configure operation of transceiver 202, operation of sensor 204, and/or can be used to control an actuator 404.

Figure 5B:
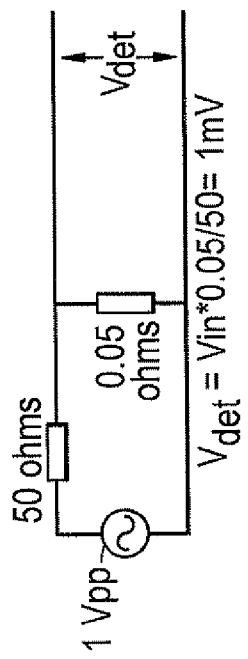
Figure 5A:
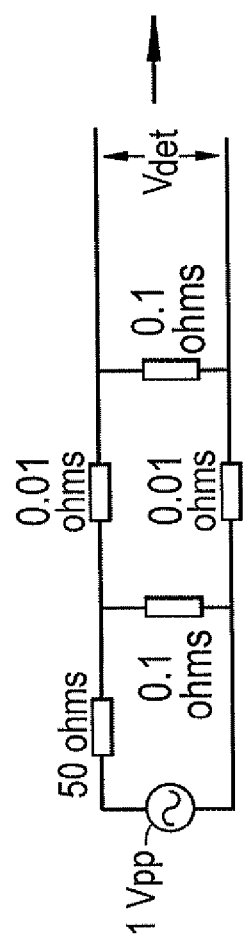

FIG. 5 illustrates how a practical embodiment translates to an equivalent electronic circuit diagram (FIG. 5a), which can be further simplified to an electrically equivalent circuit (FIG. 5b) that demonstrates how, despite significant signal attenuation, signal can cross the barrier formed by the metal wall in FIG. 5.

FIG. 5 explains the basic concept, as it would work already for low frequency signals.

FIG. 6 illustrates a different practical embodiment, targeting higher frequency signals, whereby using capacitive coupling instead at either side of the wall eliminates the need for welds onto the metal wall.

I claim:

1. A method for communicating an electrical signal from a first region to a second region via an electrically conductive wall between the first region and the second region, the method comprising using a transmitter for generating the signal in the first region, using the wall as part of a transmission path for the signal between the first region and the second region, wherein the transmitter comprises an output impedance and means for matching the output impedance and an impedance of the wall determined by an electrical property of the wall.

2. A method according to claim 1, wherein the signal is representative of a characteristic of a medium which is present in the first region.

3. A method according to claim 2, wherein use is made of a sensor which is connected to the transmitter, the sensor is operative to supply a sensor signal to the transmitter, which sensor signal is representative of a characteristic of the medium which is present in the first region.

4. A method according to claim 1 wherein in the second region a receiver is used for receiving the signal via the wall, wherein the transmitter is galvanically coupled to the wall or wherein the transmitter is capacitively coupled to the wall.

5. A method according to claim 1 wherein the transmitter is powered via at least one of: a battery accommodated in the first region and a device accommodated in the first region for scavenging ambient energy.

6. A method according to claim 1 comprising using a further receiver in the first region for receiving a radio-frequency signal via the wall from the second region, which signal enables or disables the transmitter, powers the transmitter, configures an operational mode of the transmitter, configures a sensor which is connected to the transmitter in the first region, which sensor is operative to supply a sensor signal to the transmitter which sensor signal is representative of a characteristic of a medium present in the first region, or controls an actuator accommodated in the first region.

7. A method according to claim 1 wherein the characteristic of the medium relates to a pressure, a temperature, a level, a flow or a composition of the medium, and wherein the medium comprises a fluid which comprises at least one of: a hydrocarbon and a toxic component such as hydrogen sulphide.

8. A method according to claim 1 wherein the sensor is in direct contact with the medium.

9. A method according to claim 1 wherein the wall is a wall of a room, a vessel, a container or a pipe, and the first region is an inner region of the room, the vessel, the container or the pipe.

10. A combination of a segment of a wall between a first region and a second region and a transmitter for use in a method according to claim 1.

11. A system comprising a first region which is separated from a second region by means of an electrically conductive wall, wherein the first region comprises a transmitter for generating an electronic signal in the first region, which transmitter comprises an output impedance and means for matching the output impedance and an impedance of the wall determined by an electrical property of the wall.

12. A system according to claim 11, wherein a medium is present in the first region, preferably comprising a sensor which is connected to the transmitter, which sensor is operative to supply a sensor signal to the transmitter, which sensor signal is representative of a characteristic of the medium which is present in the first region.

13. A system according to claim 10, further comprising in the second region a receiver for receiving the signal via the wall.

14. A system according to claim 1 wherein the wall is a wall of a room, a vessel, a container or a pipe, and the first region is an inner region of the room, the vessel, the container or the pipe.

15. A system according to claim 1 wherein the wall is made of a material selected from the group consisting of metals and metal alloys.

* * * * *